United States Patent [19]
Behar et al.

[11] Patent Number: 6,039,885
[45] Date of Patent: Mar. 21, 2000

[54] PROCESS AND DEVICE INTENDED FOR ULTRAFILTRATION OF PARTICLES IN FLUIDS

[75] Inventors: Emmanuel Behar, Jouy le Moutier; Alexander Werner, Paris, both of France

[73] Assignee: Institut Francais Du Petrole, Rueil-Malmaison, France

[21] Appl. No.: 08/940,012

[22] Filed: Sep. 29, 1997

[30] Foreign Application Priority Data

Sep. 27, 1996 [FR] France .................................. 96 11922

[51] Int. Cl.[7] .................................................. B01D 29/03
[52] U.S. Cl. ........................ 210/767; 210/335; 210/445; 210/489; 210/496; 210/503; 210/510.1; 210/769; 210/791
[58] Field of Search .............................. 210/321.84, 445, 210/510.1, 496, 767, 769, 791, 503, 335, 489

[56] References Cited

U.S. PATENT DOCUMENTS

| | | | |
|---|---|---|---|
| 133,720 | 12/1872 | Pettijohn | 210/510.1 |
| 2,256,145 | 9/1941 | Hock | 210/112 |
| 4,458,528 | 7/1984 | Roper et al. | 73/151 |
| 4,595,507 | 6/1986 | Chang et al. | 210/638 |
| 4,595,667 | 6/1986 | Takase et al. | 502/63 |
| 4,644,283 | 2/1987 | Vinegar et al. | 324/376 |
| 4,689,150 | 8/1987 | Abe et al. | 210/496 |
| 4,910,758 | 3/1990 | Herrick | 378/71 |
| 5,191,184 | 3/1993 | Shin | 210/769 |

FOREIGN PATENT DOCUMENTS 3-66705   3/1991   Japan ..................... 210/767

*Primary Examiner*—Matthew O. Savage
*Attorney, Agent, or Firm*—Antonelli, Terry, Stout & Kraus, LLP

[57] ABSTRACT

Process and device intended for ultrafiltration of particles contained in fluids. The fluids are passed through at least one filtering barrier made from a source rock with micropores below a few hundred Angströms in diameter. These rock samples are available in good supply for example when drilling through reservoirs containing hydrocarbons. The filtering device comprises a housing (1) containing at least one thin disk (5) cut in a source rock, through which fluid is passed. This disk withstands high pressures and temperatures well, and it can be regenerated after use by means of a thermal process. The process and device can be applied for filtering of colloidal particles such as resins or asphaltenes in petroleum fluids for example.

13 Claims, 2 Drawing Sheets

PROCESS AND DEVICE INTENDED FOR ULTRAFILTRATION OF PARTICLES IN FLUIDS

FIELD OF THE INVENTION

The present invention relates to a process and to a device for filtering particles in fluids.

The process according to the invention can be used for all sorts of applications where particles of different sections are separated mechanically and only those having a section below a certain threshold are kept. This is notably the case in the petroleum industry where certain heavy petroleum fractions, such as resins whose average diameter can range between some 10 to 70 angströms (Å) or asphaltenes whose average diameter is in the 10–200 Å range, are to be isolated mechanically. This is also the case when polymers, proteins, etc, are to be selected.

It also has applications notably in physico-chemistry where the distribution of the various constituents of a mixture is to be studied (in the form of histograms for example) as a function of a criterion which may be either the section, the volume or the molar mass thereof. This type of analysis is generally conducted by studying first the X-ray and/or the neutron diffusion spectrum as a function of the diffusion angle or vector. In order to pass from this spectrum to the distribution sought, it is necessary to select a geometric model representative of the distribution of the particles concerning the shape thereof: sphere, disk, etc, as well as the section thereof. Knowledge of the distribution of particles in certain size ranges by means of selective filtering allows to remove uncertainties about the model and consequently to reach the histogram sought more safely.

BACKGROUND OF THE INVENTION

There are various types of filters with different filtering capacities. Examples of well-known filters include those based on cellulose esters, polytetrafluroethylene or polyvinylidene difluoride. They have pores with relatively large average diameters that can range between several hundred and several thousand angströms with maximum working temperatures of the order of 100° C. to 200° C.

It is also well-known to use filters made from clays or zeolites whose pores can be extremely fine, of the order of some Å, which have very diverse applications notably in chemistry, and which are used for example to select chain-like molecules. However, their cost is relatively high.

U.S. Pat. Nos. 2,256,145 or 4,458,528 notably describe the use of porous rock samples for filtering fluids.

SUMMARY OF THE INVENTION

The process according to the invention intended for ultrafiltration of particles in fluids is characterized in that the substances to be filtered are passed through a filtering element made from a source host rock taken from the subsoil, with micropores having an average diameter below some hundred Angströms and preferably in the 10 Å<d<200 Å range, which is suitable for example in the petroleum industry notably for filtering heavy fractions such as resins or asphaltenes suspended in petroleum fluids or for filtering polymers, proteins etc.

According to an embodiment, the process further comprises thermal removal the particles retained in the filtering element made from a source rock sample bringing the filtering element to a temperature of several hundred °C.

The process can comprise for example selective sealing of pores of the source rock by injection of a plugging substance (araldite for example) at a predetermined pressure selected as a function of the capillary pressure prevailing in the pores to be plugged, when the diameter of the rock pores has too great a disparity in view of the section of the particles to be filtered.

To reinforce the filtering selectivity, it is also possible to superpose two filtering elements, among which one at least can be made from a source rock and the other can be for example a commercial filter.

The filtering device according to the invention comprises a housing containing a filtering element made from a source rock provided with natural micropores whose section is suited to that of the particles to be filtered, with average diameters below some hundred Angströms and preferably in the 10 Å<d<200 Å range.

The ultrafiltration device according to the invention can be used for example for filtration of heavy fractions such as resins or asphaltenes suspended in petroleum fluids, for filtration of polymers or proteins or for direct calibration of X-ray and/or neutron diffusion spectra.

Using such a filter is advantageous since the filtering element can be cut in source rocks that are easily available. Cores that are in any case extracted for analysis during petroleum exploration phases can be used. The filters obtained are not very costly. Besides, the filtering elements obtained from such rocks can be readily regenerated after use since they can withstand the high temperatures required for thermal removal of the organic matter retained in the pores. These filters are suitable for many applications in the petroleum industry.

BRIEF DESCRIPTION OF THE DRAWING

Other features and advantages of the invention will be clear from reading the description hereafter of an embodiment given by way of non limitative example with reference to the accompanying drawing wherein.

DESCRIPTION OF THE INVENTION

The comparative table hereunder shows by way of example the relatively large typical dimensions of the pores of reservoir rocks in which hydrocarbons accumulate, the much finer dimensions of the pores of source rocks and, by way of comparison, the dimensions observed on resin and asphaltene particles that are to be retained by filtration for certain applications, as well as the typical dimensions of the pores of filtering membranes for example made of mixed cellulose ester, halfway between the dimensions of the pores of reservoir rocks and of source rocks respectively.

|  | Size in $\mu$m |
|---|---|
| Reservoir rocks (macropores) | 50–200 |
| Source rocks (micropores) | 0.001–0.003 |
| Resin particles | 0.001–0.007 |
| Asphaltene particles | 0.001–0.020 |
| Membranes | 0.45 |

It can be seen that a filter made from a microporous rock such as a source rock is well-suited for retaining very fine colloidal particles for example (resin or asphaltene particles for example), all the more so because filtration operations are carried out at relatively high pressures and high temperatures, which other filter types of comparable porosity cannot withstand without quickly degrading.

For certain applications where the particles to be retained by filtration are larger, another type of porous rock with appropriate pore diameters can be selected. Particles with a diameter above 200 μm for example can be stopped by a filtering element cut in a reservoir rock.

Figure 1:
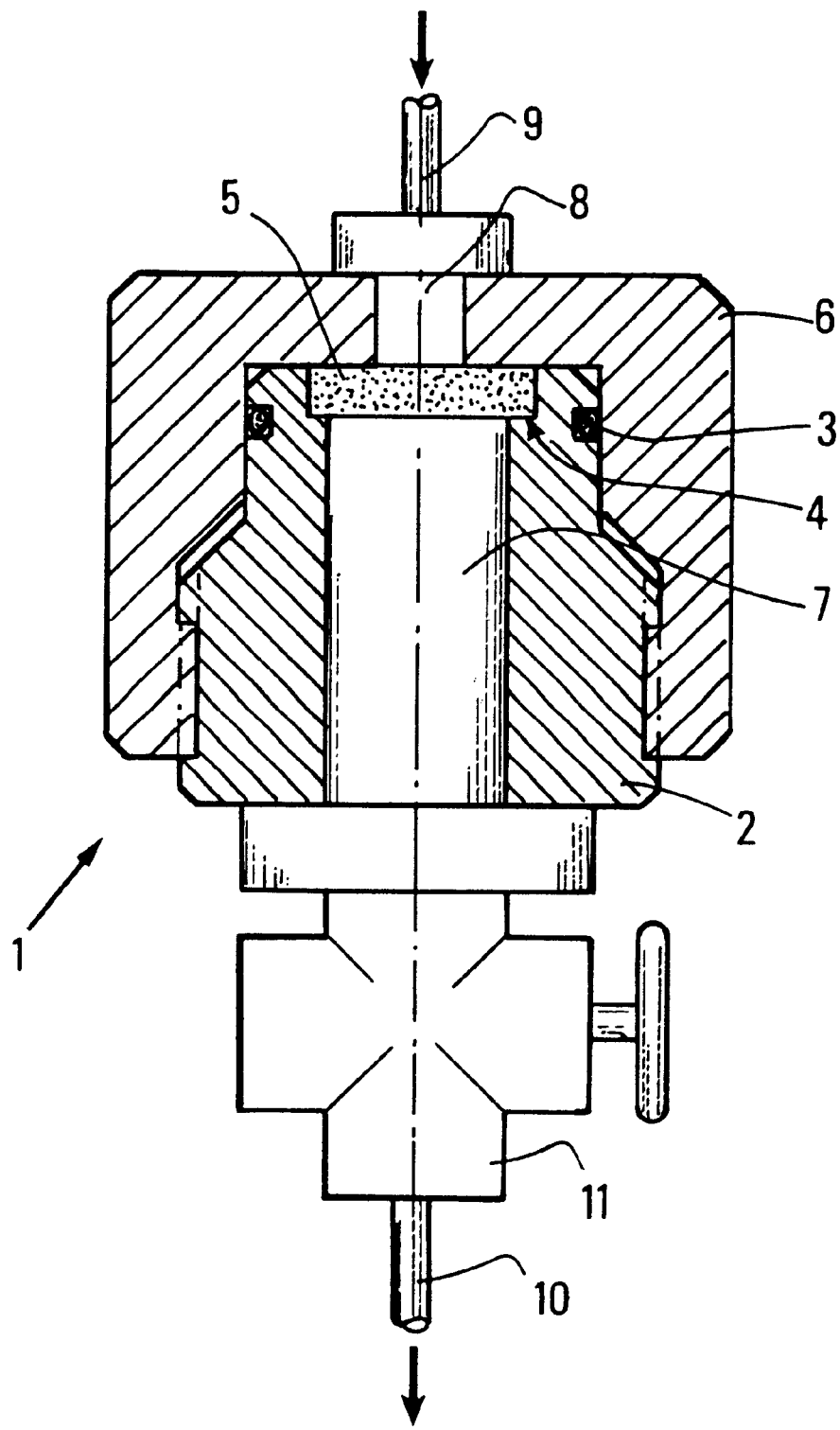
FIG. 1 is a schematic sectional view of a filtering housing with a filtering element consisting of a thin disk made from a porous rock.

The filter holder shown in FIG. 1 comprises for example a housing 1 made of two parts: a support element 2 provided with seals 3, fitted in the upper part thereof with a cavity 4 for a disk 5 cut in a porous rock with a pore diameter suited to the type of particles to be filtered, on which a lid 6 is screwed. The support element and the lid are respectively provided with axial bores 7, 8 communicating with one another through the filtering disk, and with means for fastening an injection line 9 and an outlet line 10. A valve 11 is interposed on the outlet line for example.

If the disparity in the diameter of the pores of the porous rock used is such that certain particles to be filtered are nevertheless likely to pass through the largest pores, it is possible to seal them by injecting a substance such as araldite for example. Selective plugging is obtained by means known in the art, by modulating the substance injection pressure as a function of the capillary pressure corresponding to the pores to be sealed.

It is also possible to superpose two different filtering elements, one at least being made from a cake cut in a porous rock so as to decrease the passage probability of particles with diameters above a certain predetermined range.

Figure 2:
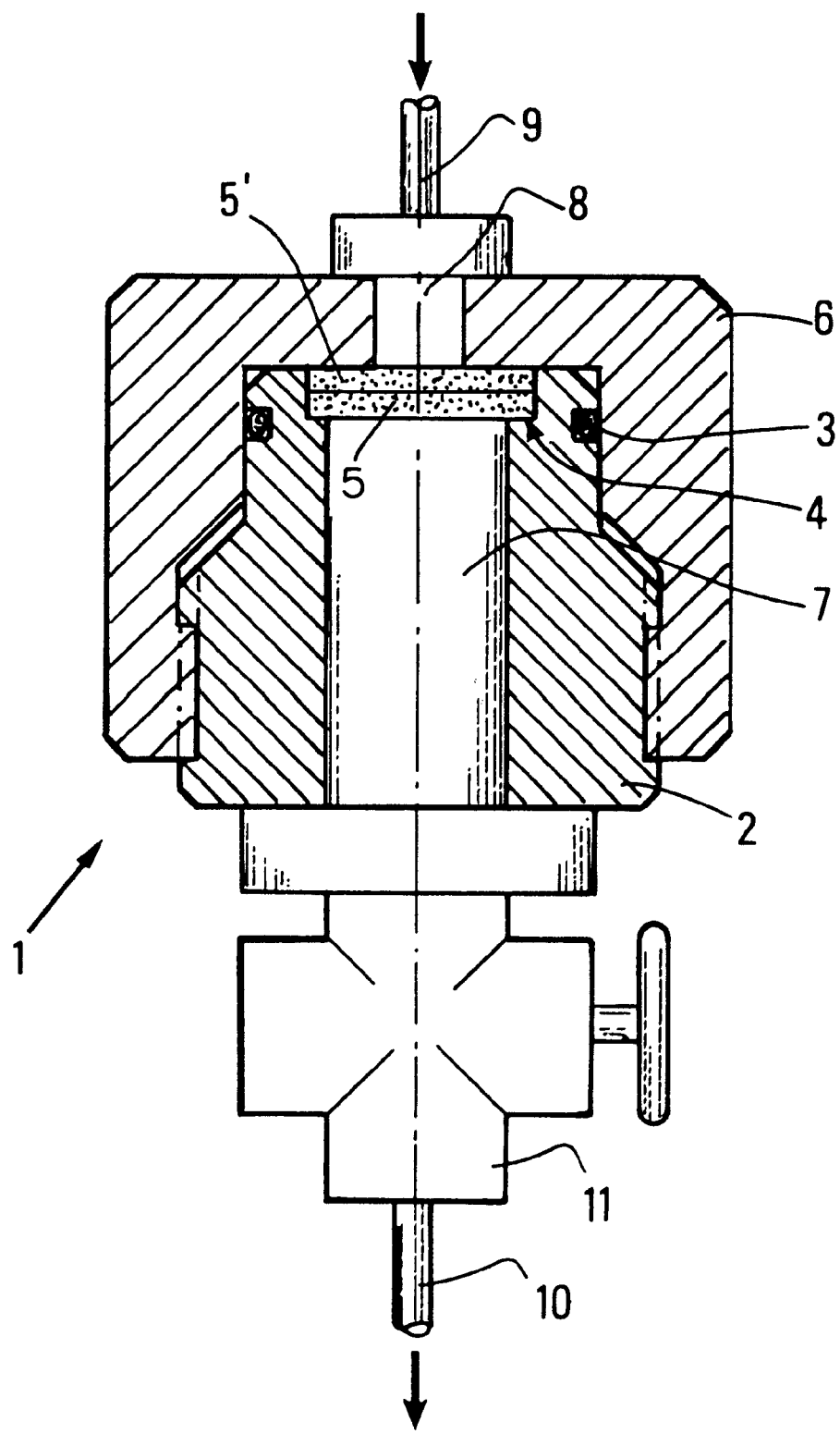
FIG. 2 is a schematic section view of a filtering housing with a filtering element consisting of a thin disk made from a porous rock and a second filter thereabove.

Two filtering elements can for example be superposed in the filter-holder housing as shown in FIG. 2. The first one is for example a cake made from a source rock, such as element 5. Another filter 5' is placed above, either a conventional filter based on cellulose esters for example or another cake cut in another porous rock with larger pore diameters, such as a reservoir rock.

It is claimed:

1. An ultrafiltration process for ultrafiltration of particles from fluids, comprising the steps of:

providing at least a first filtering element made from a source rock, said source rock having micropores having an average diameter of between 10–200 Angstroms;

passing fluids containing particles through said first filtering element; and retaining particles having a diameter larger than said average diameter within said micropores.

2. An ultrafiltration process as claimed in claim 1, further comprising heating said source rock to regenerate said source rock by thermally removing the particles retained in said source rock.

3. An ultrafiltration process as claimed in claim 1, wherein said step of providing the first filtering element includes the step of sealing selected pores of said source rock by injecting a plugging substance into the selected pores.

4. The process as claimed in claim 1, further comprising the step of superposing a second filtering element upon said first filtering element.

5. A process as claimed in claim 1, wherein said particles are resins or asphaltenes and said fluids are petroleum fluids.

6. A process as claimed in claim 1, wherein said particles are polymers or proteins.

7. A process according to claim 1, wherein said particles are heavy petroleum fractions.

8. A process according to claim 7, wherein said heavy petroleum fractions are resins with diameters in a range of 10 Å–70 Å.

9. A process according to claim 7, wherein said heavy petroleum fractions are asphaltenes with diameters in a range of 10 Å–200 Å.

10. An ultrafiltration device for ultrafiltration of particles from fluids, comprising a housing having a passage through which fluids can flow, and a first filtering element made from a source rock provided in the passage, wherein said source rock includes micropores having an average diameter between 10–200 Angstroms.

11. An ultrafiltration device as claimed in claim 10, further comprising a second filtering element within said housing superposed upon said first filtering element.

12. An ultrafiltration device as claimed in claim 11, wherein said second filtering element is made from a porous substance.

13. An ultrafiltration device as claimed in claim 11, wherein said second filtering element is cut from a porous rock and has an average pore diameter different from the average pore diameter of the first filtering element.

* * * * *